US008565831B2

(12) United States Patent
Chang et al.

(10) Patent No.: US 8,565,831 B2
(45) Date of Patent: Oct. 22, 2013

(54) MOBILE TERMINAL AND METHOD FOR CONTROLLING THE SAME

(75) Inventors: Jina Chang, Seoul (KR); Sunghyun Cho, Seoul (KR); Dami Choe, Seoul (KR); Sukhyun Lim, Seoul (KR); Eunsang Lee, Seoul (KR); Hyosang Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 113 days.

(21) Appl. No.: 13/071,404

(22) Filed: Mar. 24, 2011

(65) Prior Publication Data

US 2011/0275416 A1 Nov. 10, 2011

(30) Foreign Application Priority Data

May 6, 2010 (KR) .................. 10-2010-0042372

(51) Int. Cl.
*H04M 1/00* (2006.01)
(52) U.S. Cl.
USPC ..... 455/566; 455/413; 455/550.1; 455/575.3; 345/163; 345/169
(58) Field of Classification Search
USPC ........... 455/466, 156, 413, 556.1, 414.1, 566, 455/574, 550.1; 345/173, 156; 358/1.15; 715/719
See application file for complete search history.

(56) References Cited

U.S. PATENT DOCUMENTS

| 8,184,193 | B2 * | 5/2012 | Yoshimi et al. | 348/333.05 |
|---|---|---|---|---|
| 2007/0064015 | A1 * | 3/2007 | Sugiyama et al. | 345/629 |
| 2008/0288672 | A1 * | 11/2008 | Shibuya | 710/48 |
| 2008/0292279 | A1 * | 11/2008 | Kamada et al. | 386/124 |
| 2009/0063967 | A1 * | 3/2009 | Lee et al. | 715/702 |
| 2009/0158222 | A1 * | 6/2009 | Kerr et al. | 715/867 |
| 2009/0199119 | A1 * | 8/2009 | Park et al. | 715/765 |
| 2010/0039400 | A1 * | 2/2010 | Jang | 345/173 |
| 2010/0231536 | A1 * | 9/2010 | Chaudhri et al. | 345/173 |
| 2010/0251121 | A1 * | 9/2010 | Rosser et al. | 715/720 |
| 2010/0262911 | A1 * | 10/2010 | Kaplan et al. | 715/719 |
| 2010/0303440 | A1 * | 12/2010 | Lin et al. | 386/241 |
| 2011/0211802 | A1 * | 9/2011 | Kamada et al. | 386/201 |

* cited by examiner

*Primary Examiner* — Joseph Arevalo
(74) *Attorney, Agent, or Firm* — Lee, Hong, Degerman, Kang & Waimey

(57) ABSTRACT

Disclosed herein are a mobile terminal and a method for controlling the same, which provide a user with a frame-scale content playback progress status information from the related art time-scale content playback progress status information. As described above, the mobile terminal includes a touch screen configured to display a playback screen of a content including image, and a controller controlling operations associated to a playback of the content. Herein, the controller may detect whether or not a command for displaying a playback progress status of the content in one of a time scale and a frame scale is being inputted. And, when the command is inputted, the controller may switch and display the playback progress status of the content from the time scale to the frame scale, and vice versa.

19 Claims, 16 Drawing Sheets

(a)

(b)

(a)  (b)

(c)

(a)

(b)

(a)

(b)

(a)

(b)

MOBILE TERMINAL AND METHOD FOR CONTROLLING THE SAME

CROSS-REFERENCE TO RELATED APPLICATIONS

Pursuant to 35 U.S.C. §119(a), this application claims the benefit of earlier filing date and right of priority to Korean Application No. 10-2010-0042372, filed on May 6, 2010, the contents of which is hereby incorporated by reference herein in its entirety.

FIELD OF THE INVENTION

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

DISCUSSION OF THE RELATED ART

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Meanwhile, when displaying a moving picture (or video), the current mobile terminal provides a progressive bar (or progress bar) indicating the playback progress in a time scale on the screen displaying the moving picture (or video) (i.e., the video display screen).

The user can be aware of the current playback position of the video (or moving picture) by referring to the progressive bar. Additionally, the user may also change the playback location of the moving picture by moving the progressive bar.

SUMMARY OF THE INVENTION

Accordingly, the present invention is directed to a mobile terminal and a method for controlling the same that substantially obviate one or more problems due to limitations and disadvantages of the related art.

Another object of the present invention is to provide a mobile terminal and a method for controlling the same that can provide the user with information on a playback progress of a content in a frame scale, instead of the time scale provided in the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a touch screen configured to display a playback screen of a content including image, and a controller controlling operations associated to a playback of the content. Herein, the controller may detect whether or not a command for displaying a playback progress status of the content in one of a time scale and a frame scale is being inputted. And, when the command is inputted, the controller may switch and display the playback progress status of the content from the time scale to the frame scale, and vice versa.

In another aspect of the present invention, a method for controlling a mobile terminal includes displaying a playback screen of a content including image on a touch screen, detecting whether or not a command for displaying a playback progress status of the content in one of a time scale and a frame scale is being inputted, and, when the command is inputted, displaying the playback progress status of the content in one of the time scale and the frame scale in accordance with the inputted command.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
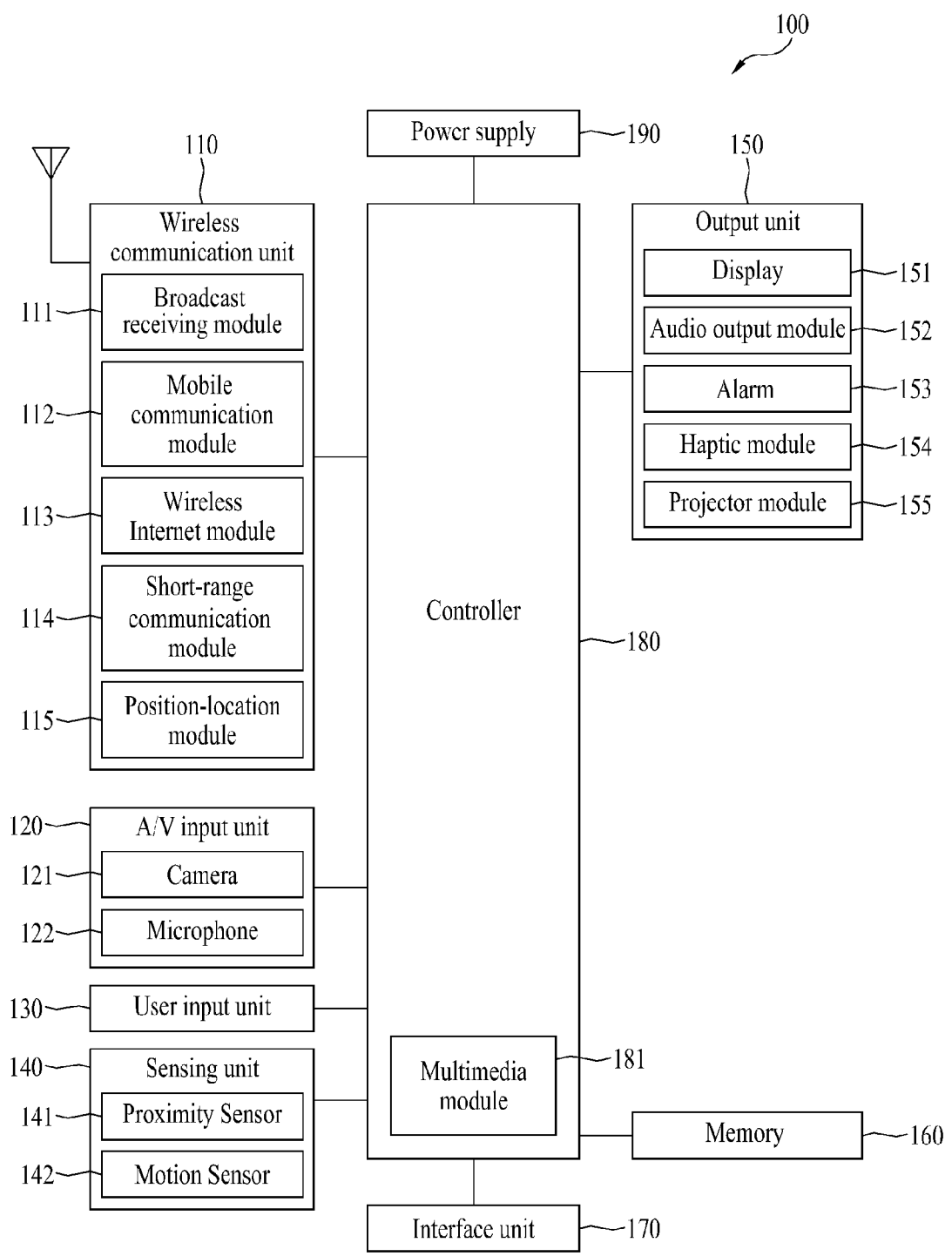
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122.

The camera 121 possesses a digital zoom and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141 and a motion sensor 142.

The motion sensor 142 may be realized as a gyro sensor, a tilt sensor (or inclinometer), an acceleration sensor (or accelerometer), and so on. And, the motion sensor 142 outputs a sensing signal with respect to the movement detected from the main body of the mobile terminal 100 to the controller 180.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air through an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
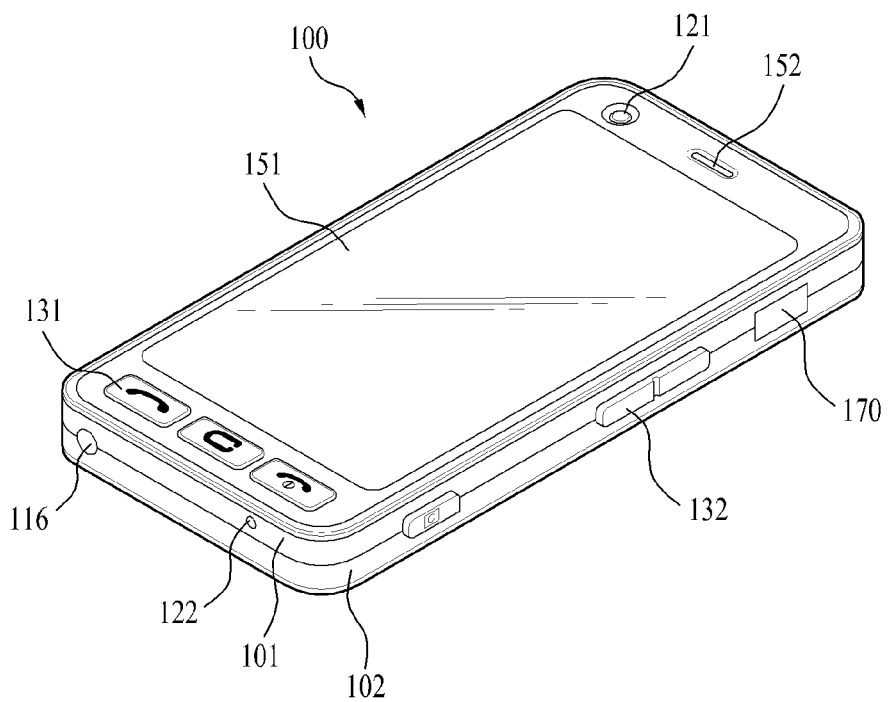
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The user input unit 130 is manipulated to receive a command for controlling an operation of the terminal 100. And, the user input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output module 152, a command for a switching to a touch recognizing mode of the display 151 or the like can be inputted to the second manipulating unit 132.

Figure 2B:
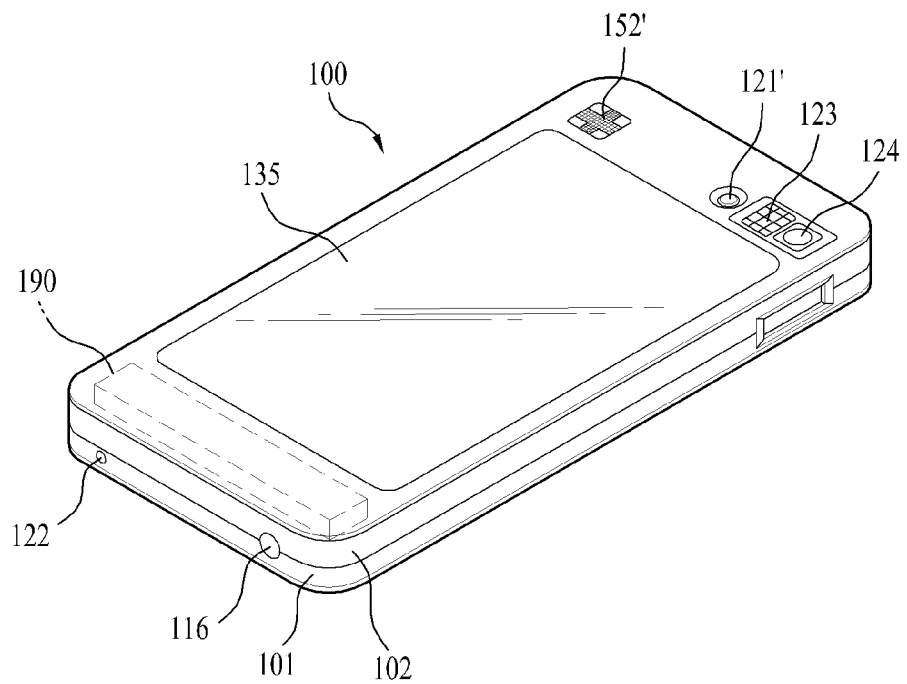
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output module 152' can be provided to the backside of the terminal body. The additional audio output module 152' is able to implement a stereo function together with the former audio output module 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

Hereinafter, a procedure for providing the user with information on a playback progress in frame image scales, when playing back a video (or moving picture), according to the present invention will now be described in detail with reference to FIG. 3 to FIG. 16.

Figure 3:
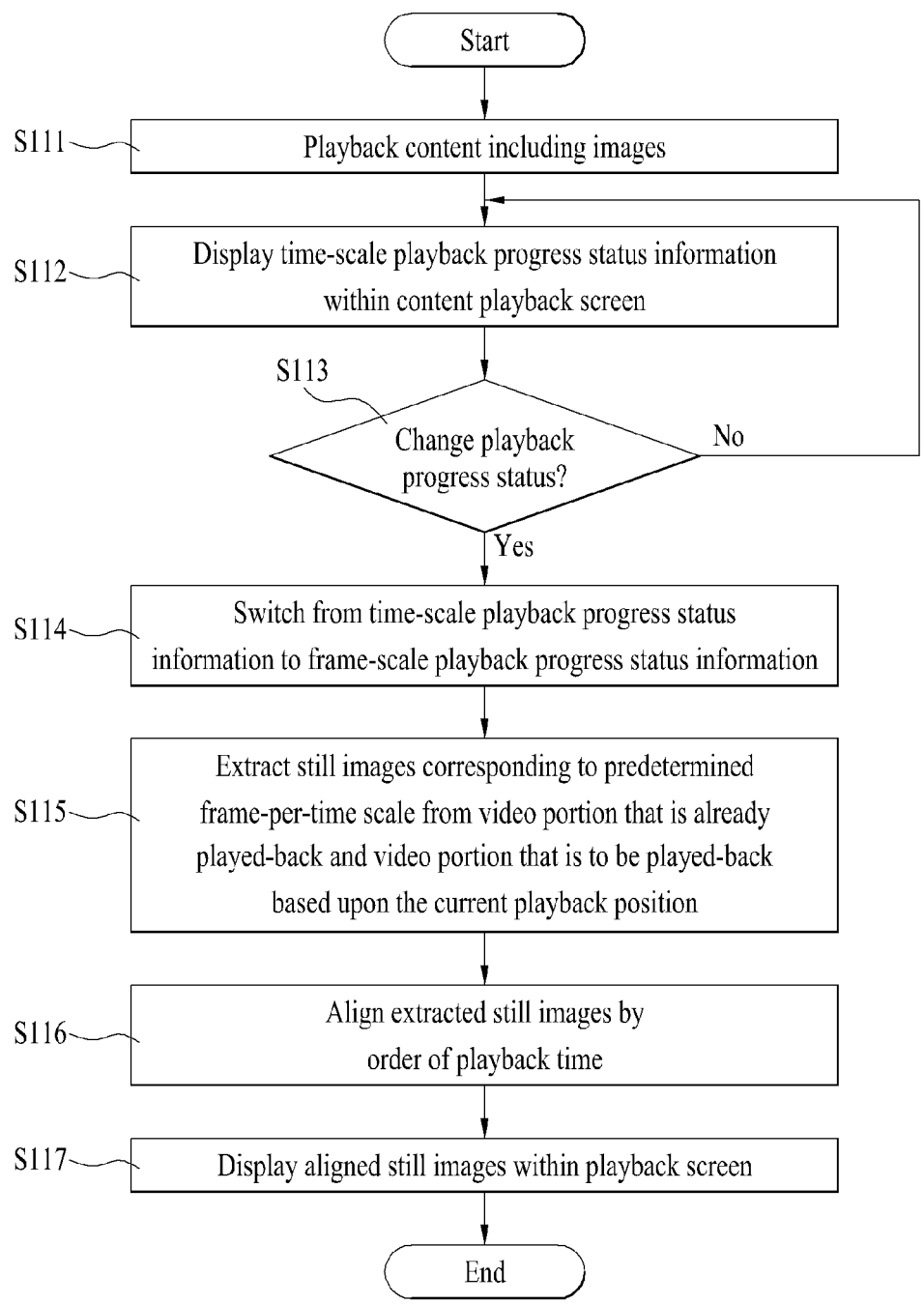
FIG. 3 illustrates a flow chart showing the process steps of a procedure for displaying a playback progress in frame image scales when playing back a video according to the present invention.

FIG. 3 illustrates a flow chart showing the process steps of a procedure for displaying a playback progress in frame image scales when playing back a video according to the present invention.

FIG. 4 to FIG. 16 respectively illustrate screen display status showing the procedure for displaying a playback progress in frame image scales when playing back a video according to the present invention.

Referring to FIG. 3 to FIG. 16, the controller 180 of the mobile terminal 100 plays-back (or reproduces) the content 200 including a video (or image) through the user input unit 130 or a touch screen 151 [S111].

More specifically, the controller 180 displays the video (or image) of the content 200 through the touch screen 151, and the controller 180 outputs the sound of the content 200 through the audio output module 152, thereby playing-back (or reproducing) the content 200.

When the content 200 is being played-back (or reproduced), the controller 180 displays information 300 indicating the conventional time-scale playback progress in one area of the playback screen of the content 200 [S112].

The time-scale playback progress information 300 is generally referred to as a progressive bar (or progress bar). And, as shown in (a) of FIG. 4, the playback progress of the content is represented by displaying a current playing time in the form of a bar 400 between a playback start time and a playback end time.

Meanwhile, when information 300 indicating the time-scale playback progress is displayed as the playback progress information of the content, the controller 180 controls the audio output module 152 so that a sound notifying that the current playback progress is being displayed in a time scale 300 can be outputted. At this point, the memory 160 may be provided in advance with the sound notifying the time-scale playback progress 300, or the sound notifying the time-scale playback progress 300 may be determined by user settings.

Subsequently, while the time-scale playback progress information 300 is being displayed, when a command for switching the time-scale playback progress information 300 to a frame-scale playback progress information 500 according to the present invention is inputted by the user [S113], the controller 180 switches the playback progress from the time-scale playback progress information 300 to the frame-scale playback progress information 500 [S114].

Thereafter, based upon the current playback position, the controller 180 extracts still images corresponding to a predetermined frame-per-time scale from an already played-back portion of the video and a portion of the video that is to be played-back [S115]. Then, the controller 180 aligns the extracted still images by an order of the playback time of the content 200 [S116]. Afterwards, the controller 180 displays the aligned still images in the area where the time-scale playback progress information 300 is being displayed [S117].

At this point, when the controller 180 switches the playback progress information of the content 200 from the time scale 300 to the frame scale 500, the controller 180 may control the audio output module 152 so as to output a sound notifying that the current playback progress is being displayed in the frame scale 500. Herein, the memory 160 may be provided in advance with the sound notifying the frame-scale playback progress 500, or the sound notifying the frame-scale playback progress 500 may be determined by user settings.

Meanwhile, among the keys provided in the user input unit 130, the switching command of step S113 may be inputted by a key predetermined by the user or by a key set up by default in the mobile terminal 100.

More specifically, when the user selects a specific first key among the keys provided in the user input unit 130, the controller 180 assigns the time-scale function to the selected first key. And, when the user selects a specific second key among the keys provided in the user input unit 130, the controller 180 assigns the frame-scale function to the selected second key.

Thereafter, when a command is inputted through the first key during the playback of the content 200, the controller 180 displays the time-scale playback progress information assigned to the first key as the playback progress of the current content 200. Also, when a command is inputted through the second key during the playback of the content 200, the controller 180 displays the frame-scale playback progress information assigned to the second key as the playback progress of the current content 200.

Furthermore, when the user selects a specific third key among the keys provided in the user input unit 130, the controller 180 assigns a time-scale/frame-scale switching function to the selected third key.

Subsequently, each time a command is inputted through the third key during the playback of the content 200, the controller 180 may display the playback progress of the content 200 by alternately switching from time scale to frame scale.

Furthermore, the switching command of step S113 may correspond to an input of a touch gesture having a predetermined pattern through the touch screen 151, or the switching command of step S113 may correspond to a predetermined motion gesture of the main body of the mobile terminal 100 inputted through the motion sensor 142.

Figure 4:
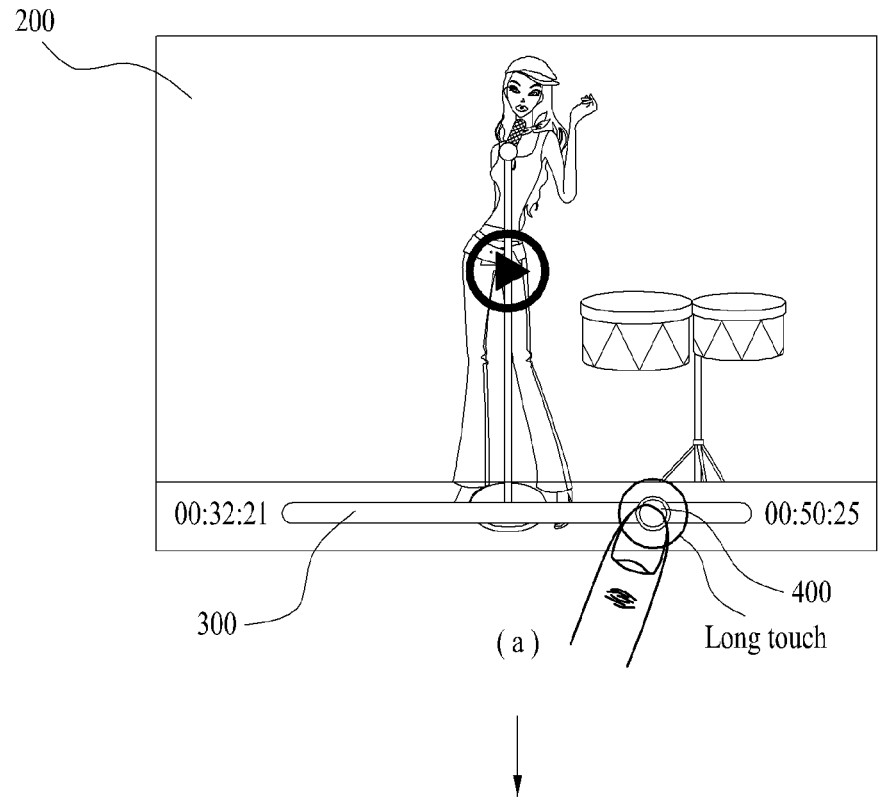
FIG. 4 to FIG. 16 respectively illustrate screen display status showing the procedure for displaying a playback progress in frame image scales when playing back a video according to the present invention.
Figure 4:
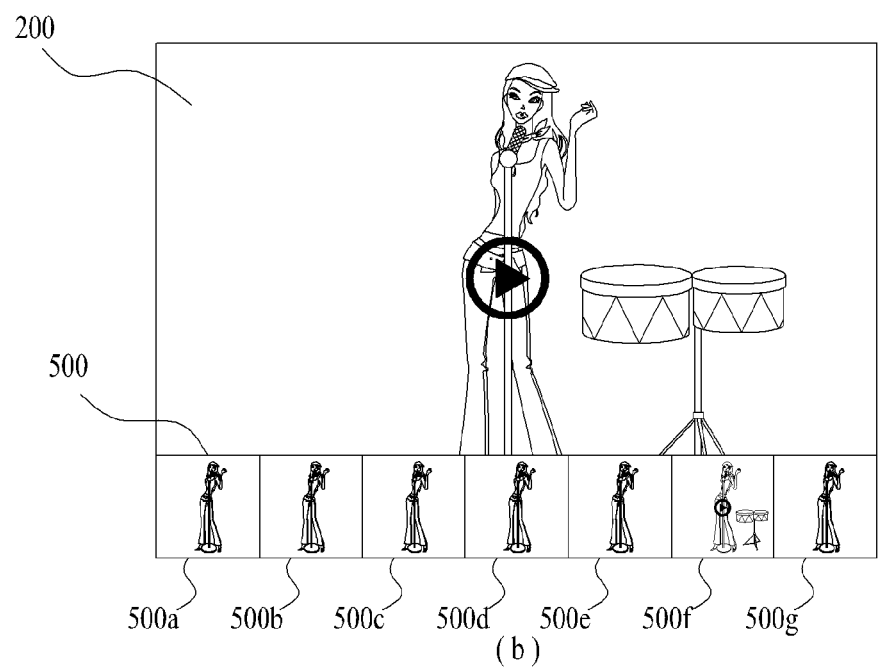
Figure 5:
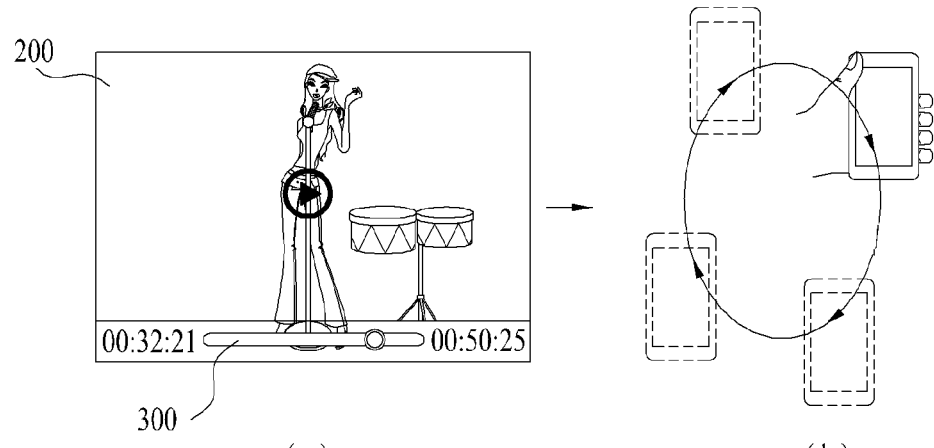
Figure 5:
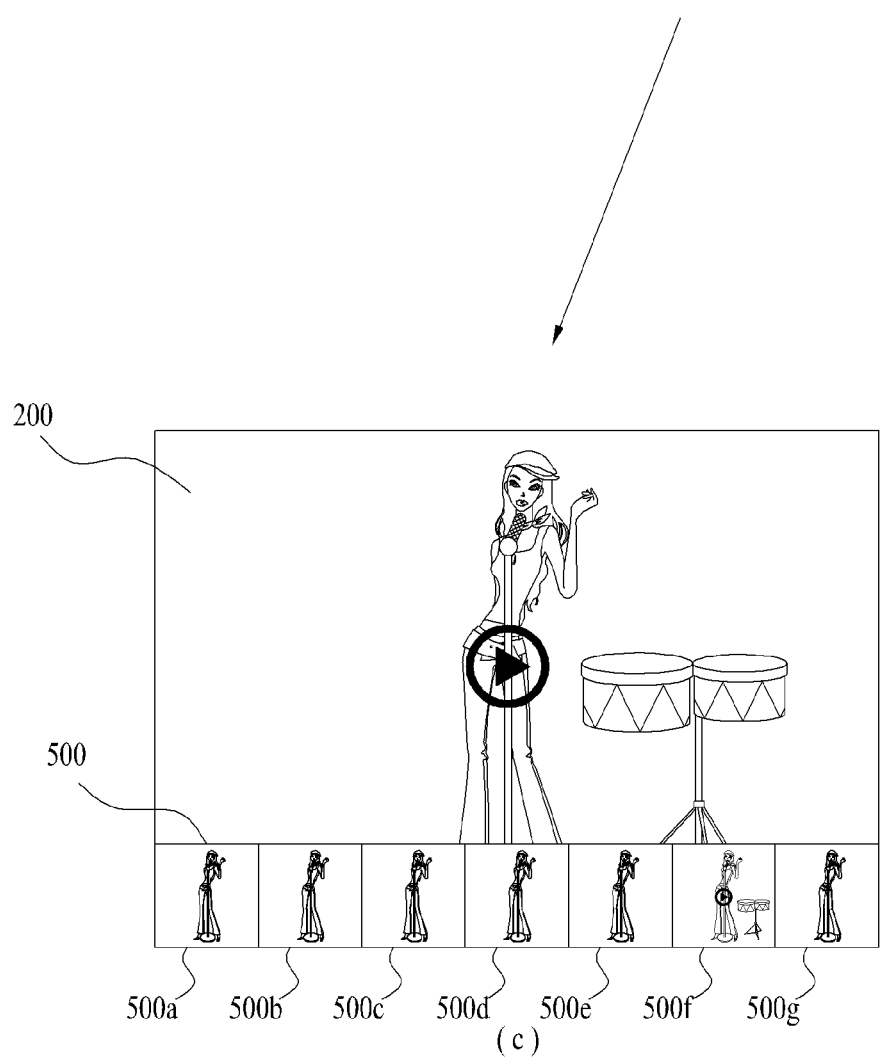

Hereinafter, FIG. 4 shows an example of the switching command of step S113 being inputted as a touch gesture, and FIG. 5 shows an example of the switching command of step S113 being inputted as a motion gesture.

More specifically, as shown in (a) of FIG. 4, in a state where the time-scale playback progress information 300 is being displayed in the playback screen of the content 200, when a playback bar 400 within the time-scale playback progress information 300 is touched by a predetermined method, as an example of the switching command of step S113, the controller 180 switches the display of the playback progress from the time-scale playback progress information 300 to the frame-scale playback progress information 500 according to the present invention, as shown in (b) of FIG. 4.

At this point, in FIG. 4, a long touch applied to the playback bar 400 is shown as an example of the predetermined touch gesture. Herein, a long touch refers to a touch on the playback bar 400 being applied and maintained for a predetermined period of time and then released.

Meanwhile, although a long touch is given as an example of the predetermined gesture in FIG. 4, the present invention will not be limited only to the example given herein.

More specifically, the mobile terminal 100 may provide the user with a setup menu for a touch gesture that is to be used as the switching command of step S113. Accordingly, by using the setup menu, the user may freely decide and set up the touch gesture he or she wishes to use as the switching command of step S113.

Also, as shown in (a) of FIG. 5, when the time-scale playback progress information 300 is being displayed in the playback screen of the content 200, the controller 180 operates the motion sensor 142 so as to detect a movement in the main body of the mobile terminal 100.

At this point, when a predetermined motion gesture is inputted through the motion sensor 142, as an example of the switching command of step S113, the controller 180 switches the display of the playback progress from the time-scale playback progress information 300 to the frame-scale playback progress information 500 according to the present invention, as shown in (c) of FIG. 5.

Meanwhile, although a motion gesture having a circular pattern is given as an example of the predetermined motion gesture in FIG. 5, the present invention will not be limited only to the example given herein.

More specifically, the mobile terminal 100 may provide the user with a setup menu for a motion gesture that is to be used as the switching command of step S113. Accordingly, by using the setup menu, the user may freely decide and set up the motion gesture he or she wishes to use as the switching command of step S113.

Furthermore, the switching command of step S113 may correspond to a playback state of the content 200 or a paused state of the content 200.

More specifically, while the content 200 is being displayed, the controller 180 displays the time-scale playback progress status 300. And, while the content 200 is in a paused state, the time-scale playback progress status 300 is switched to the frame-scale playback progress status 500.

Meanwhile, as shown in FIG. 4 and FIG. 5, the controller 180 generates thumbnail images 500a to 500g respective to each of the still images created in steps S115 and S116. Thereafter, the controller 180 aligns the created thumbnail images 500a to 500g by order of the playback time and displays the aligned thumbnail images 500a to 500g.

More specifically, a whole of the thumbnail images 500a to 500g may correspond not to a single image but to a group of images that can each be separately selected and identified.

Figure 6:
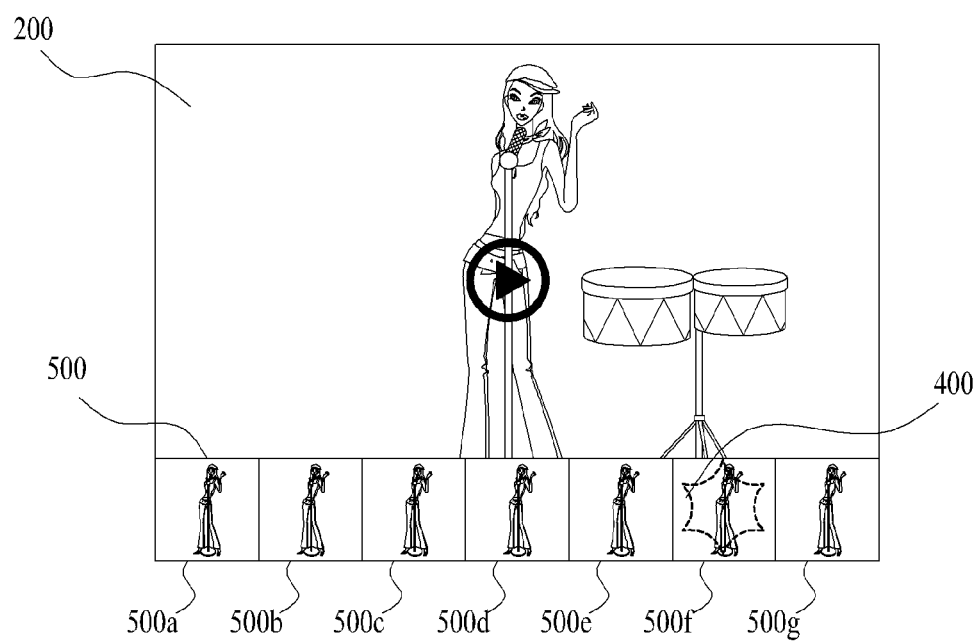
Figure 7:
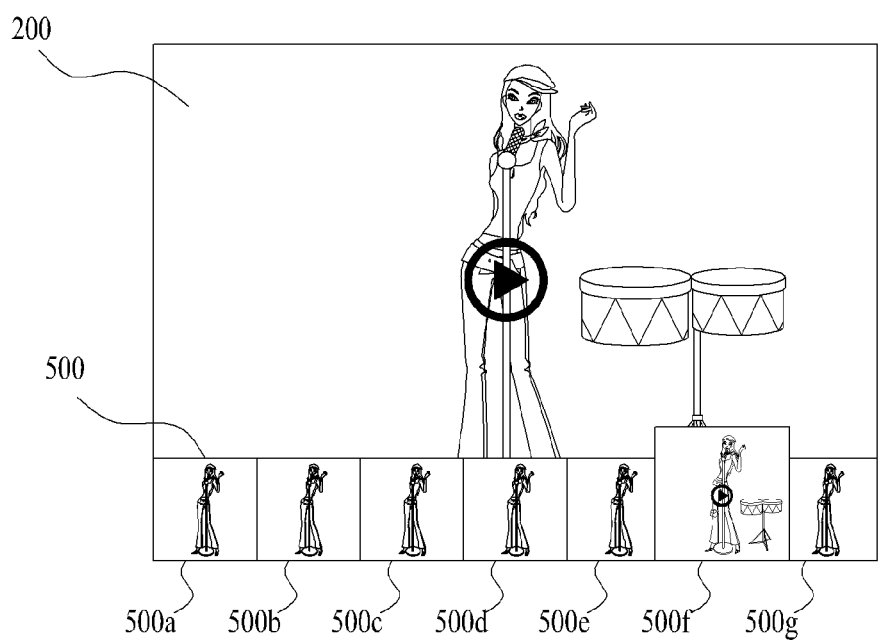

Also, as shown in FIG. 6 and FIG. 7, when the frame-scale playback progress information 500 is displayed in step S117, among the still images 500a to 500g, the controller 180 may mark a still image 500f corresponding to the current playback position of the content 200, so that the still image 500f can be identified from the other still images.

More specifically, as shown in FIG. 6, among the still images 500a to 500g, by making the still image 500f corresponding to the current playback position of the content 200 blink, the controller 180 may notify the user of the still image 500f corresponding to the current playback position within the frame-scale playback progress information 500.

Also, as shown in FIG. 7, among the still images 500a to 500g, by enlarging the size of the still image 500f corresponding to the current playback position of the content 200, the controller 180 may notify the user of the still image 500f corresponding to the current playback position within the frame-scale playback progress information 500.

At this point, although it is not shown in FIG. 7, the controller 180 may vary the display color of the still image 500f corresponding to the current playback position of the content 200, so that the display of the corresponding still image 500f can be differentiated from the other still images. Alternatively, the controller 180 may also emphasize the border of the corresponding still image 500f so that the corresponding still image 500f can be displayed differently.

Figure 8:
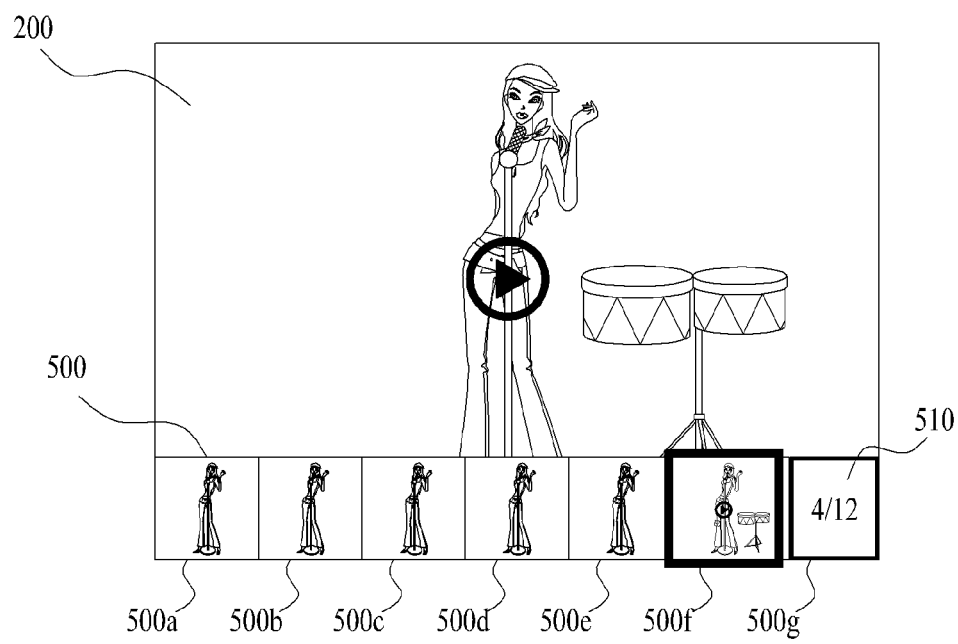

Meanwhile, as shown in FIG. 8, instead of displaying all of the frames of the content 200 within the frame-scale playback progress information 500, the controller 180 may display only the frames that are approximate to the current playback position.

More specifically, as shown in FIG. 8, the controller 180 may categorize the still images into a plurality of groups by an order most approximate to the current playback position 500f.

Then, the controller 180 may display the categorized groups by the order most approximate to the current playback position 500f.

At this point, the controller 180 may display information 510 indicating the group corresponding to the currently displayed frames with respect to the entire groups within the frame-scale playback progress information 500. And, when the corresponding information 510 is selected, frames of a previous or next group of the currently displayed group may also be displayed.

Hereinafter, a procedure for changing the playback position of the content 200, which is currently being played-back, by using frames within the frame-scale playback progress information 500 will now be described in detail with reference to FIG. 9 and FIG. 10.

Figure 9:
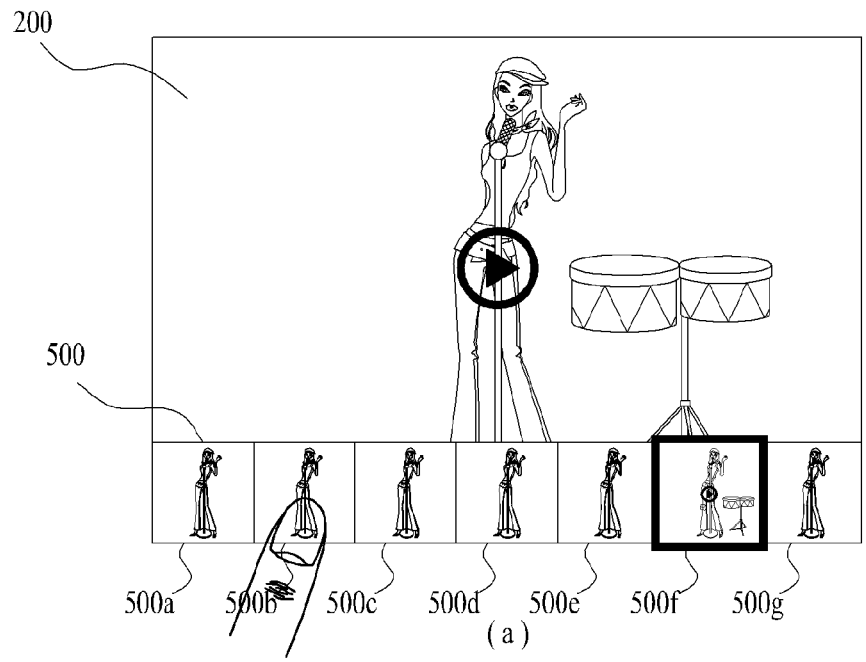
Figure 9:
Figure 9:
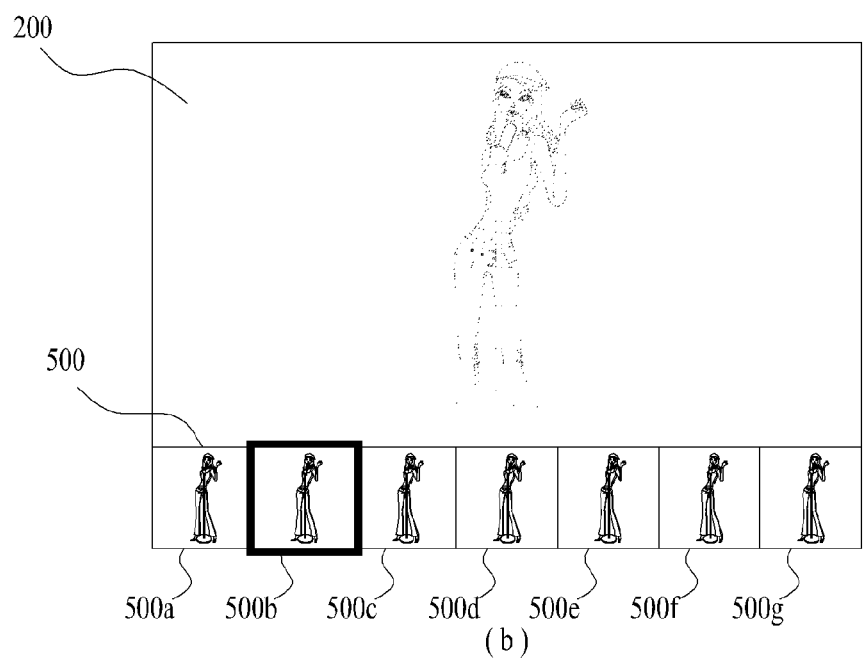

First of all, as shown in (a) of FIG. 9, while the frame-scale playback progress information 500 is being displayed, among the frames 500a to 500g, when a frame 500b other than the frame 500f corresponding to the current playback position is selected, the controller 180 changes the current playback position 500f to the position corresponding to the selected frame 500b, as shown in (b) of FIG. 9.

Also, although it is not shown in FIG. 9, when a specific frame 500b within the playback screen of the content 200 is moved outside of the position where the frames 500a to 500g are aligned, the current playback position may be changed to the position corresponding to the moved frame 500b.

More specifically, when the specific frame 500b is dragged outside of the frame-scale playback progress information 500 and dropped to the area of the screen where the content image is actually being displayed (i.e., dragged and dropped), the controller 180 may change the current playback position to the position corresponding to the dragged and dropped frame 500b.

Figure 10:
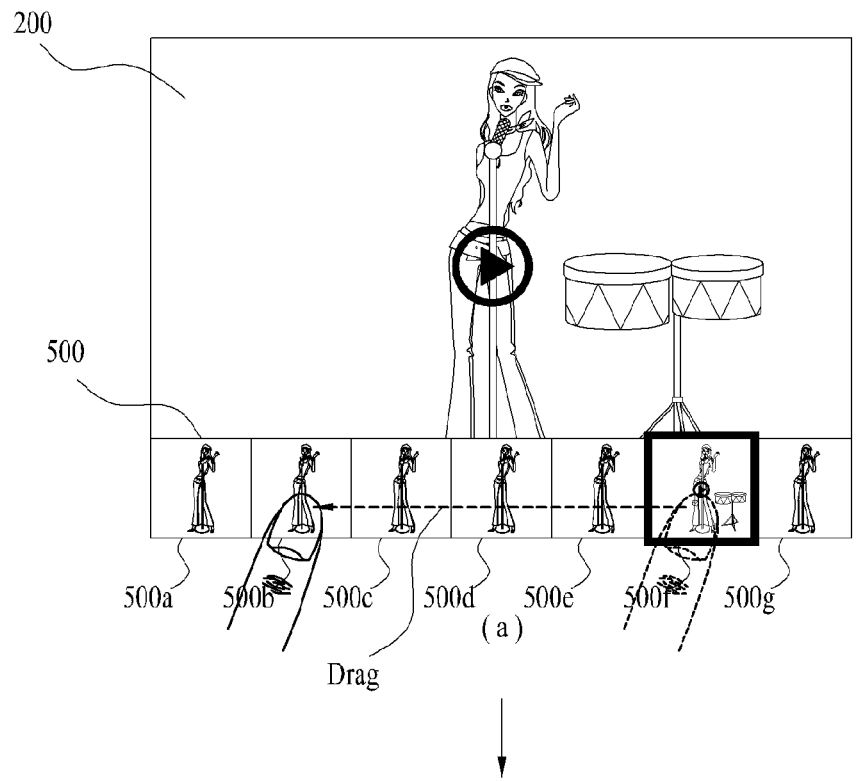
Figure 10:
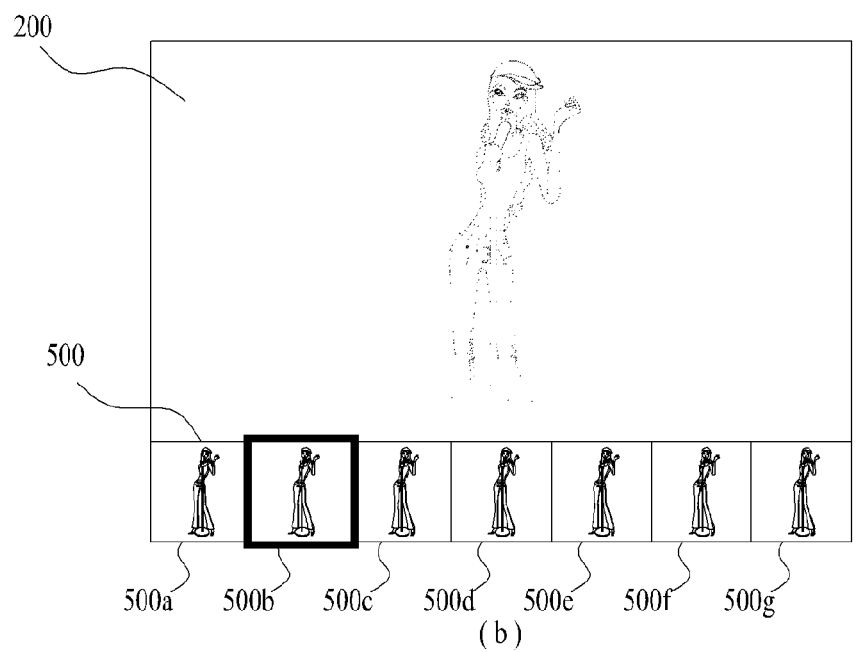

Furthermore, as shown in (a) of FIG. 10, while the frame-scale playback progress information 500 is being displayed, among the frames 500a to 500g, when the frame 500f corresponding to the current playback position is dragged and dropped to a position corresponding to another frame 500b, as shown in (b) of FIG. 10, the current playback position 500f is changed to the position corresponding to the dragged and dropped frame 500b.

Hereinafter, a procedure for increasing or reducing the frame-per-time scale of the frames by using the frames within the frame-scale playback progress information 500 will now be described in detail with reference to FIG. 11 and FIG. 12.

Figure 11:
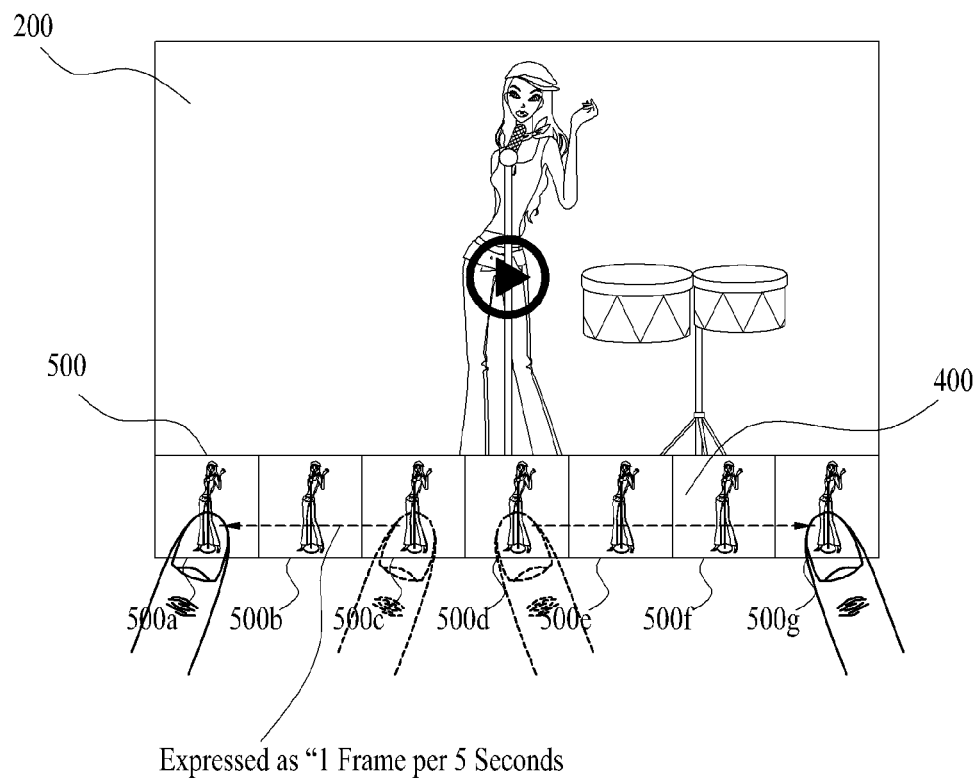

More specifically, as shown in FIG. 11, in a state where a first point and a second point within the frame-scale playback progress information 500 are multi-touched, when the distance between the two multi-touched points increases, the controller 180 increases the frame-per-time scale with respect to the increased distance.

More specifically, for example, in accordance with the increase in the distance between the two multi-touched points, FIG. 11 shows an example of the frame-per-time scale being increased to a scale of "1 frame per 5 seconds".

In other words, when the frame-per-time scale is increased to a scale of "1 frame per 5 seconds", with respect to the current playback position, the controller 180 extracts and displays portions of the video that are already played-back and portions of the video that are to be played-back at a scale of 1 frame per 5 seconds.

Figure 12:
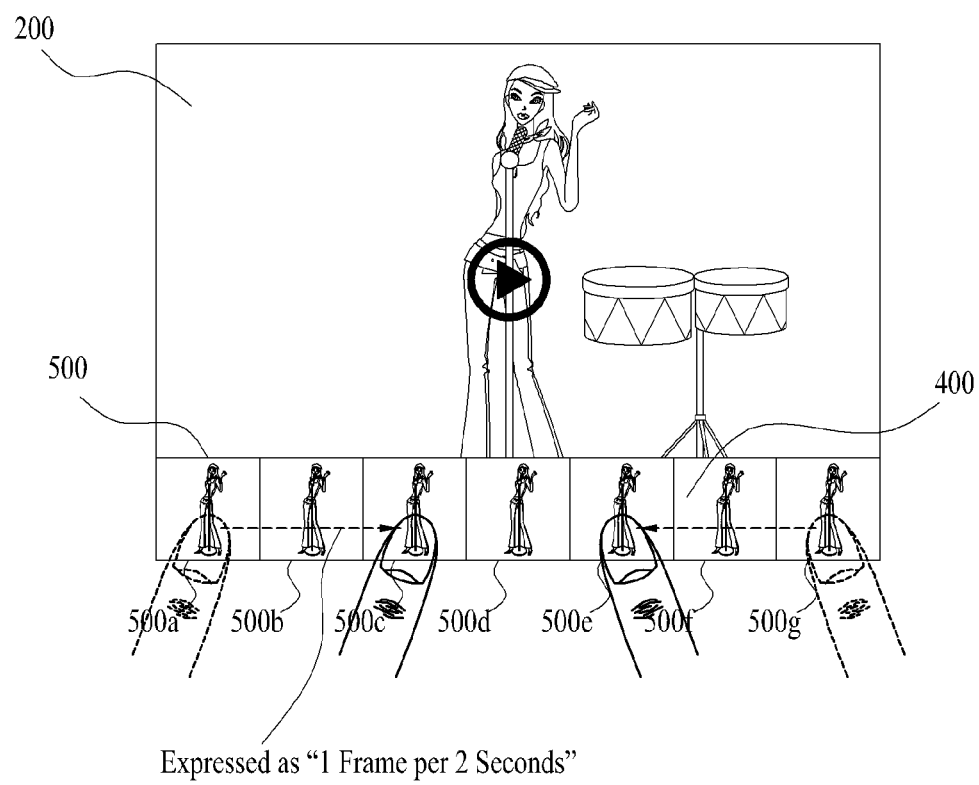

Furthermore, in a state where the frame-per-time scale is increased to "1 frame per 5 seconds", as shown in FIG. 11, when the multi-touched distance decreases, FIG. 12 shows an example wherein the frame-per-time scale is reduced to "1 frame per 2 seconds" with respect to the decreased distance.

Figure 13:
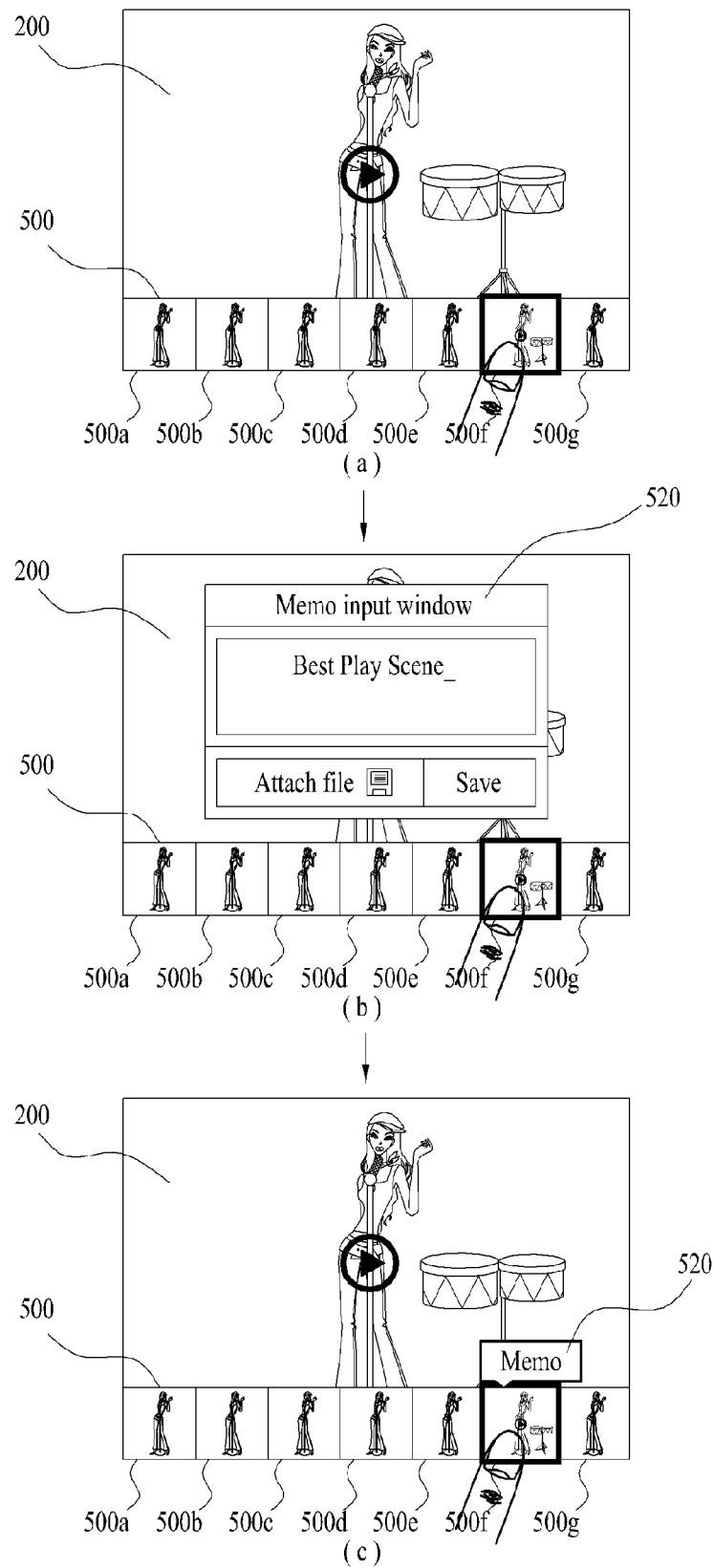

Hereinafter, FIG. 13 shows a procedure for setting up comment information, such as memos, on the frames 500a to 500g within the frame-scale playback progress information 500.

As shown in (a) of FIG. 13, while the frame-scale playback progress information 500 is being displayed, when a specific frame 500f is selected, the controller 180 displays a user interface (UI) 520 in which one or more memos that are to be attached to the selected frame 500f can be inputted, as shown in (b) of FIG. 13.

When details of the memo and data that are to be attached are set up by the user through the UI 520, the controller attaches the details of the memo and data that are to be attached to the selected frame 500f and then stores the attached note and data, thereby displaying information indicating that the memo 520 is set to the selected frame 500f, as shown in (c) of FIG. 13.

More specifically, by attaching comments, such as memos, to a specific frame 500f which the user considers particularly important among the frames 500a to 500f of the frame-scale playback progress information 500, when viewing the content 200 once again, the user may be capable of quickly identifying the portion of the content 200 which the user considers to be important.

Finally, a procedure for editing the frames within the frame-scale playback progress information 500 will now be described in detail with reference to FIG. 14 to FIG. 16.

Figure 14:
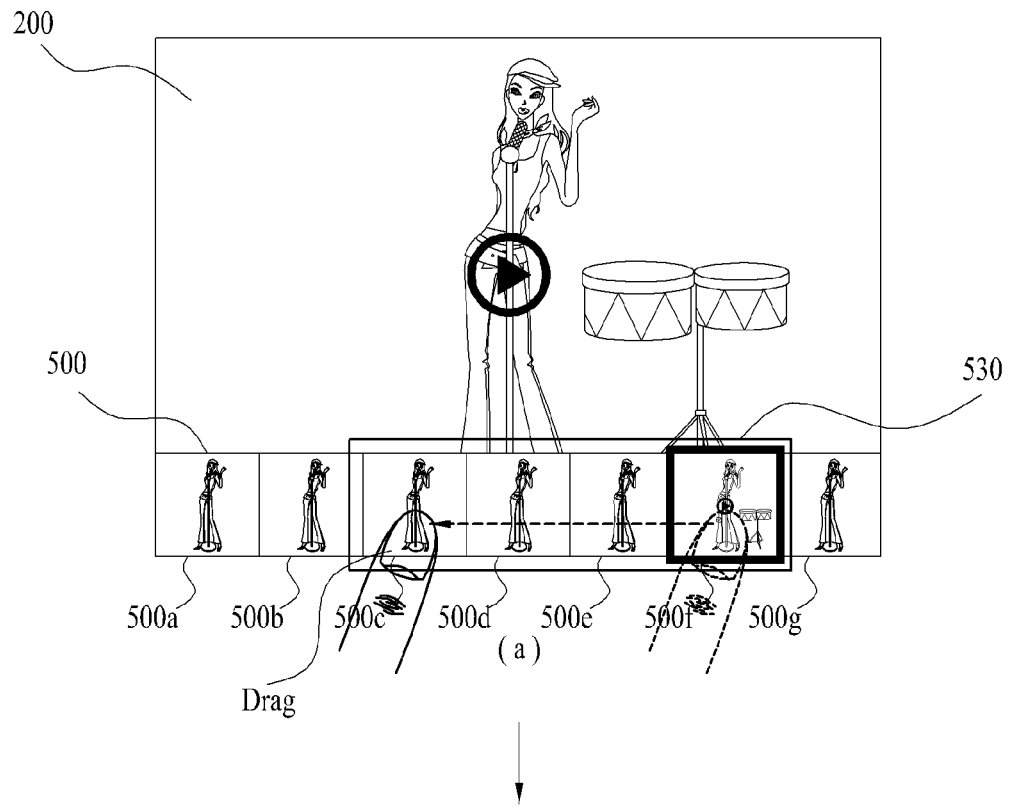
Figure 14:
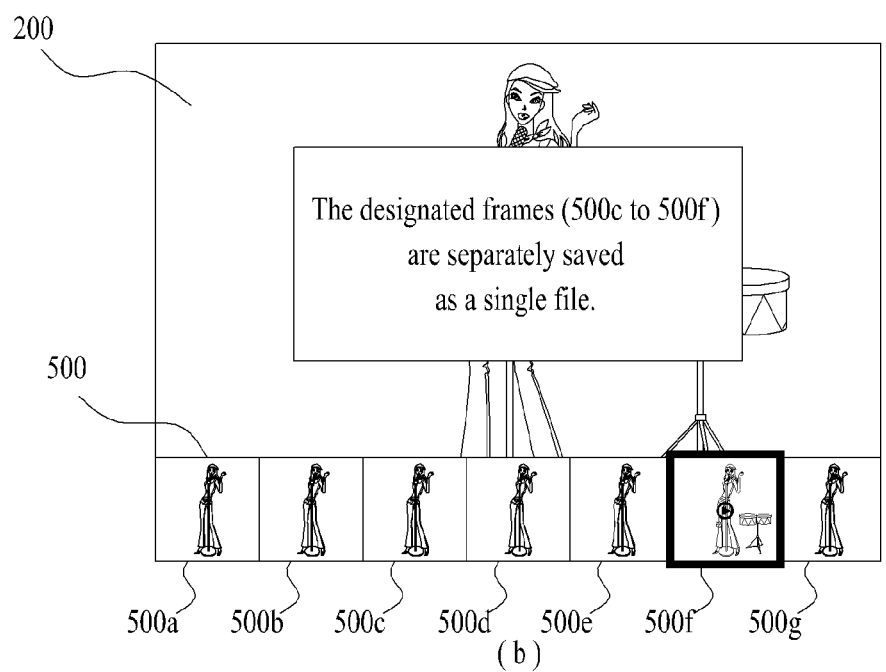
Figure 15:
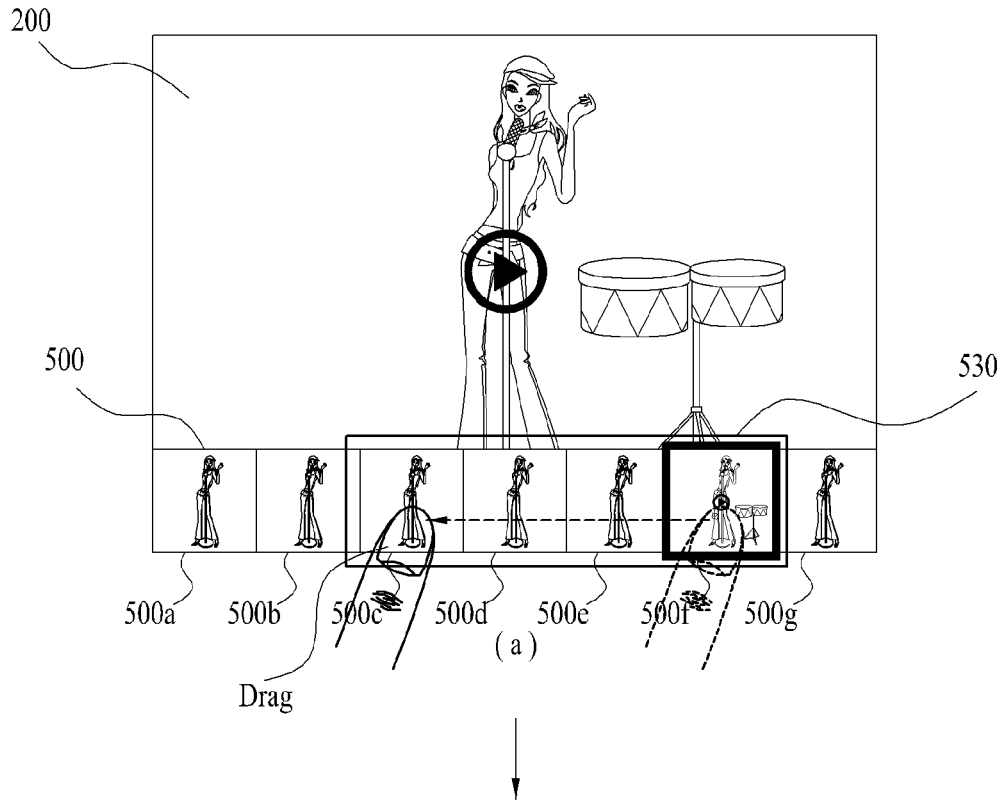
Figure 15:
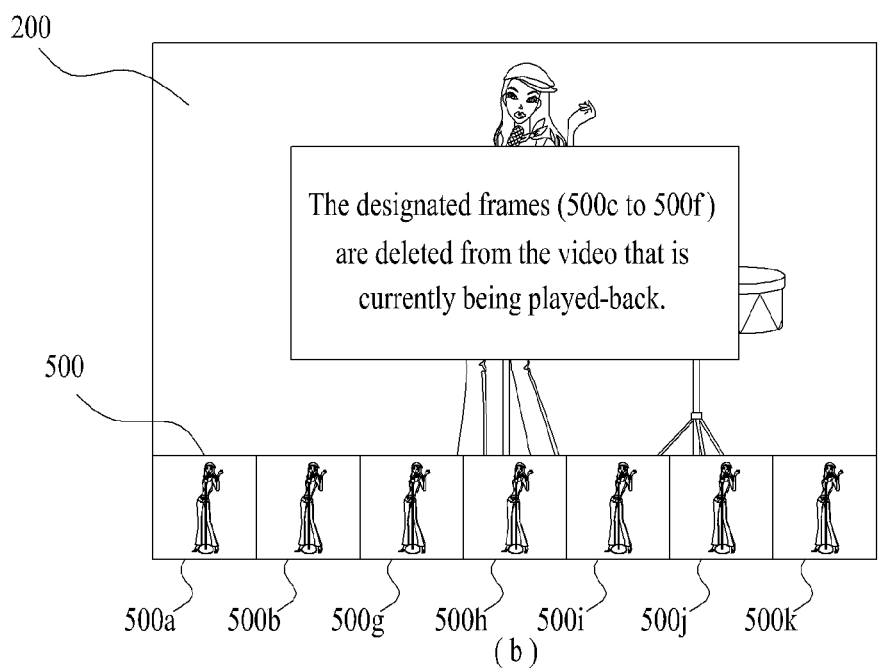

First of all, as shown in (a) of FIG. 14, among the frame 500a to 500g, when two or more frames 530 are selected, the controller 180 may separately store the selected frames 530 in the memory 160 as a single playback file, as shown in (b) of FIG. 14.

More specifically, for example, when the file name of the content 200 is "concert.avi", since the frames 530 are copied from the content 200 and stored as a single playback file, the controller 180 saves the corresponding frame 530 in the memory 160 using a storage file name associated with the file name of the content 200, such as "convert_take1.avi".

Evidently, the storage file name respective to the frames 530 can be inputted by the user.

At this point, the controller 180 may store the portions corresponding to the selected frames 530 within the content 200 as an integrated video file format, or the controller 180 may store still images of the selected frames 530 as an integrated image file format.

Subsequently, as shown in (a) of FIG. 15, among the frame 500a to 500g, when two or more frames 530 are selected, the controller 180 may delete the selected frames 530 from the content 200, as shown in (b) of FIG. 15.

At this point, the controller 180 may delete the video portion corresponding to the selected frames 530 from the content 200. Alternatively, the controller 180 may delete only the still images of the selected frames 530.

Figure 16:
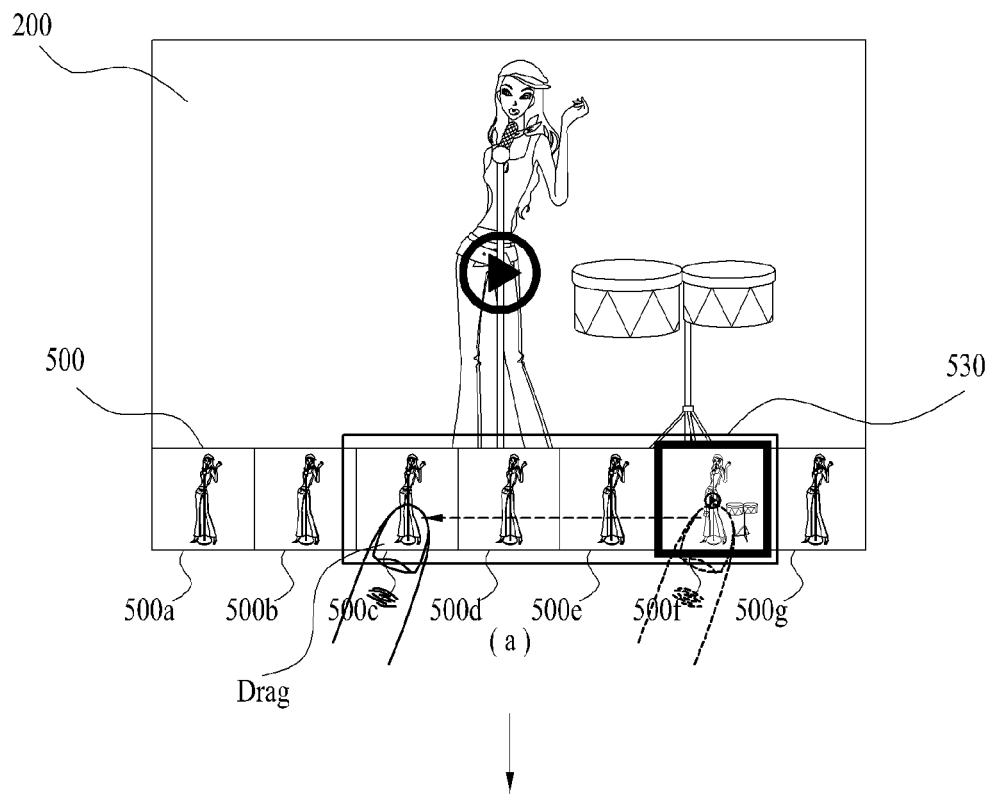
Figure 16:
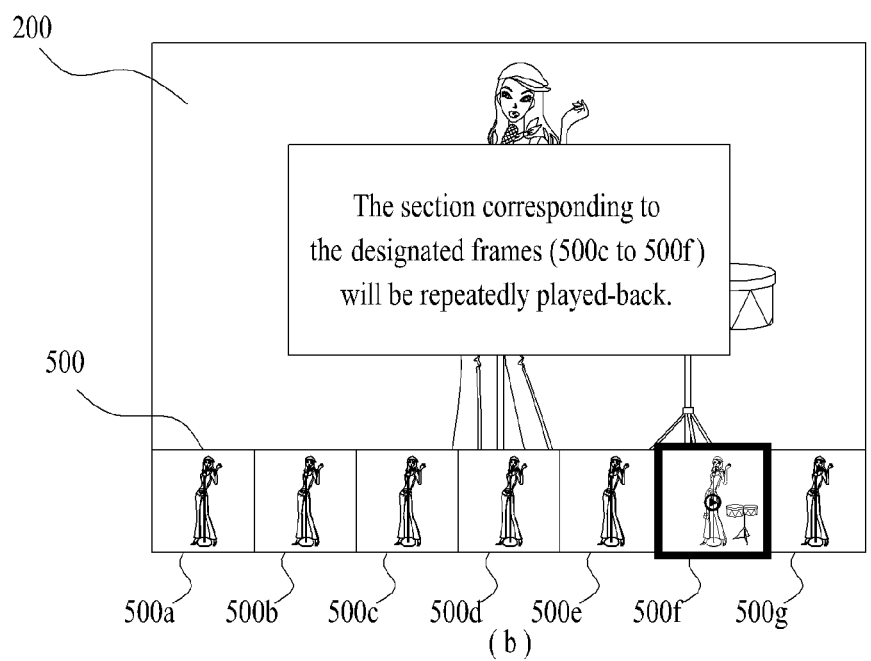

Finally, as shown in (a) of FIG. 16, among the frame 500a to 500g, when two or more frames 530 are selected, the controller 180 may repeatedly perform sectional playback of the selected frames 530, as shown in (b) of FIG. 16.

As described above, the mobile terminal and the method for controlling the same according to the present invention has the following advantages. By providing a frame-scale content playback progress status information from the related art time-scale content playback progress status information, the present invention may enable the user to immediately recognize the playback position he or she wishes to view, by referring to the frames displayed in the frame-scale content playback progress status information. Thus, the user may be capable of immediately changing the current playback position to the recognized playback position he or she wishes to view.

It will be apparent to those skilled in the art that the present invention can be specified into other form(s) without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a touch screen configured to display a playback screen of content including images;
a motion sensor configured to detect movement of the mobile terminal; and
a controller controlling operations associated with playback of the content,
wherein the controller is configured to:
cause displaying of a playback progress status of the content in one of a time scale and a frame scale;
switch the playback progress status of the content from one of the time scale and the frame scale to the other of the time scale and the frame scale when the motion sensor detects a first user input comprising a predetermined motion gesture;
cause displaying of the playback progress status of the content in the time scale when the content is being played back; and
cause displaying of the playback progress status of the content in the frame scale when the played-back content is paused.

2. The mobile terminal of claim 1, further comprising:
a user input unit provided with a switching key,
wherein the controller is further configured to switch the playback progress status of the content from one of the time scale and the frame scale to the other of the time scale and the frame scale when a second user input is received via the switching key.

3. The mobile terminal of claim 1, wherein the controller is further configured to switch the playback progress status of the content from one of the time scale and the frame scale to the other of the time scale and the frame scale when a second user input comprising a touch gesture is detected on the touch screen.

4. The mobile terminal of claim 1, wherein the controller is further configured to:
cause displaying of the playback progress status of the content in the time scale initially; and
switch the playback progress status from the time scale to the frame scale in response to the first user input.

5. The mobile terminal of claim 1, further comprising:
an audio output module configured to output an audible signal when one of the time scale and the frame scale is switched to the other of the time scale and the frame scale.

6. The mobile terminal of claim 1, wherein, when the playback progress status is displayed in the frame scale, the controller is further configured to:
extract still images corresponding to a predetermined frame-per-time scale from at least a video portion that has already been played-back or a video portion that is to be played-back; and
align the extracted still images in order of playback time for displaying.

7. The mobile terminal of claim 6, wherein each of the extracted still images is displayed as a thumbnail.

8. The mobile terminal of claim 6, wherein the controller is further configured to cause displaying of a still image corresponding to the current playback position distinguishably from the rest of the extracted still images.

9. The mobile terminal of claim 6, wherein, when one of the still images is selected, the controller is further configured to change a current playback position to a playback position corresponding to the selected still image.

10. The mobile terminal of claim 6, wherein, when one of the still images is moved outside of the aligned still images that are displayed, the controller is further configured to change a current playback position to a playback position corresponding to the moved still image.

11. The mobile terminal of claim 6, wherein, when a first still image corresponding to the current playback position is moved to a playback position corresponding to a specific second still image among the aligned still images, the controller is further configured to change a current playback position to the playback position corresponding to the specific second still image.

12. The mobile terminal of claim 6, wherein the controller is further configured to:
categorize the aligned still images into two or more groups in order of proximity to the current playback position; and
cause displaying of the categorized two or more groups.

13. The mobile terminal of claim 6, wherein:
the touch screen is further configured to receive a multi-touch input via a first point and a second point within an area displaying the still images; and
the controller is further configured to increase or reduce the frame-per-time scale in accordance with an increase or decrease in a distance between the multi-touched first point and second point.

14. The mobile terminal of claim 6, wherein, when at least one or more still images are selected from displayed still images, the controller is further configured to:
cause displaying of a user interface (UI) for receiving a memo that is to be attached to each of the selected at least one or more still images such that a memo is received via the UI; and
attach the received memo to each of the selected at least one or more still images.

15. The mobile terminal of claim 6, further comprising a memory,
wherein, when at least one or more still images are selected from displayed still images, the controller is further configured to control the memory to save the selected at least one or more still image in a file format.

16. The mobile terminal of claim 6, wherein, when at least one or more still images are selected from displayed still images, the controller is further configured to delete portions corresponding to the selected at least one or more still image from the content.

17. The mobile terminal of claim 6, wherein, when a first still image and a second still image are selected from the still images, the controller is further configured to repeatedly play-back a section of the content between the first still image and the second still image.

18. The mobile terminal of claim 1, wherein the playback progress status of the content is displayed only in the time scale when the content is being played back and the playback progress status of the content is displayed only in the frame scale when the played-back content is paused.

19. A method for controlling a mobile terminal, the method comprising:
displaying a playback screen of content including images on a touch screen of the mobile terminal;
displaying a playback progress status of the content in one of a time scale and a frame scale;
detecting a user input comprising a predetermined motion gesture generated by movement of the mobile terminal;
switching the playback progress status of the content from one of the time scale and the frame scale to the other of the time scale and the frame scale in response to the user input;
displaying the playback progress status of the content in the time scale when the content is being played back; and
displaying the playback progress status of the content in the frame scale when the played-back content is paused.

* * * * *